16 # UNITED STATES PATENT OFFICE.

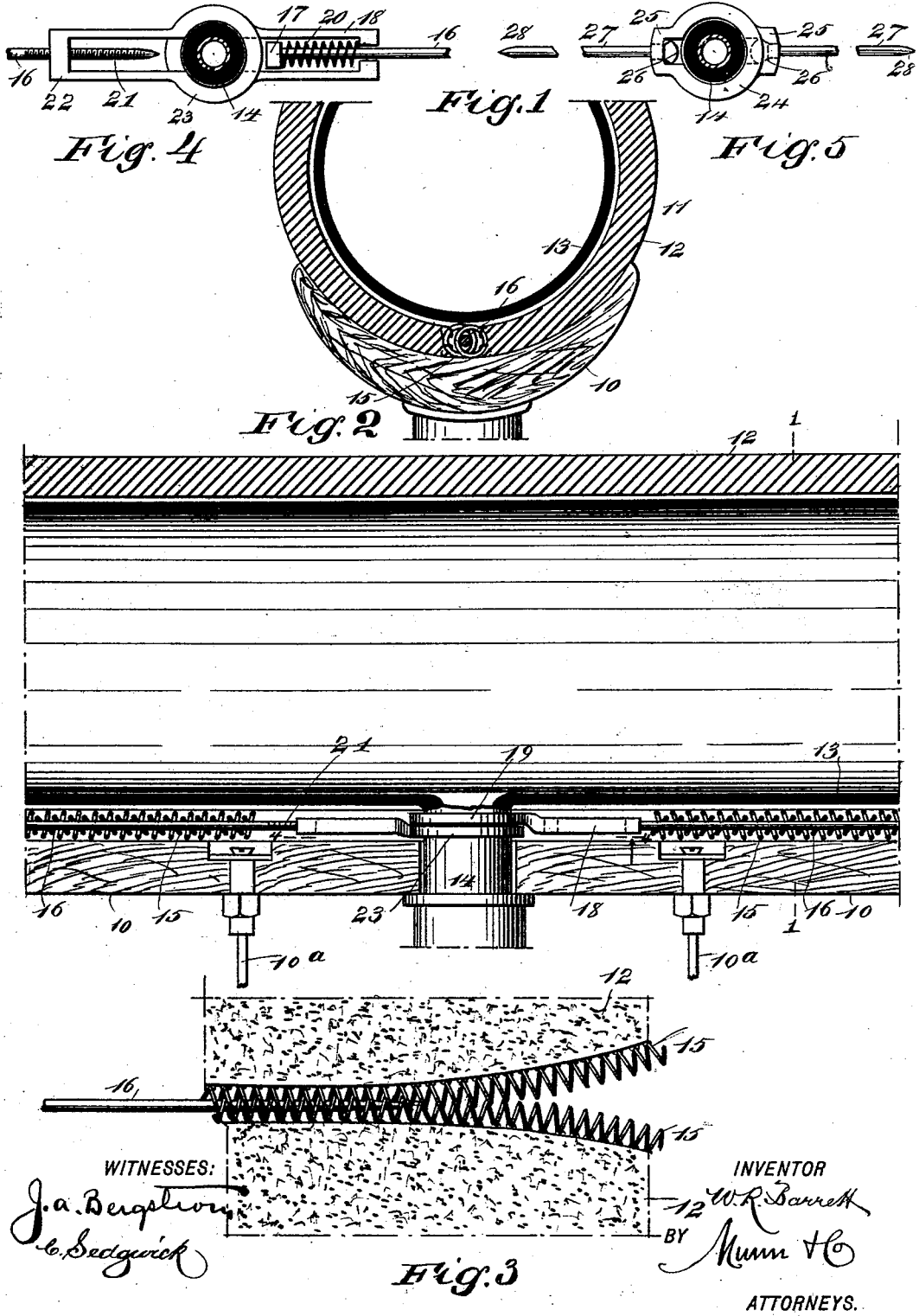

WILLIAM R. BARRETT, OF PASSAIC, NEW JERSEY.

PNEUMATIC TIRE.

SPECIFICATION forming part of Letters Patent No. 513,863, dated January 30, 1894.

Application filed November 13, 1893. Serial No. 490,782. (No model.)

*To all whom it may concern:*

Be it known that I, WILLIAM R. BARRETT, of Passaic, in the county of Passaic and State of New Jersey, have invented a new and Improved Pneumatic Tire, of which the following is a full, clear, and exact description.

My invention relates to improvements in pneumatic tires such as are used on vehicle wheels, and particularly on the wheels of bicycles.

The object of my invention is to produce a very cheap and simple tire, which may be conveniently fastened to a wheel, and which comprises the usual inner inflatable tube and an outer tube or cover, this outer tube being for the protection of the inner tube and being constructed in such a way that it may be instantly opened so as to permit the removal of the inner tube and which may be instantly closed when necessary. The object of this arrangement is to enable the inner tube to be easily removed and a new one substituted, in case the inner tube is punctured.

A further object of my invention is to construct the fastening device which unites the edges of the outer tube or cover, in such a manner that the cover may not only be quickly fastened and unfastened, but will be very durable and not likely to be accidentally loosened.

To these ends my invention consists of certain features of construction and combinations of parts, which will be hereinafter described and claimed.

Reference is to be had to the accompanying drawings forming a part of this specification, in which similar figures indicate corresponding parts in all the views.

Figure 1 is a broken cross section through the tire and felly on the line 1—1 of Fig. 2. Fig. 2 is a broken enlarged longitudinal section of the tire and felly. Fig. 3 is an enlarged detail plan view of the fastening device uniting the meeting edges of the outer tube or cover of the tire. Fig. 4 is an inverted sectional plan on the line 4—4 of Fig. 2; and Fig. 5 is a similar section of a slightly modified form of the device.

The tire is shown applied to a felly 10 of a bicycle wheel, which is of the usual kind, having the usual spokes 10$^a$, but the tire may be applied to any ordinary felly. The tire 11, comprises an outer tube or cover 12 and an inner elastic inflatable tube 13 of the usual kind. The inner tube is fitted with a common form of valve 14, any ordinary valve being suitable for the purpose, which valve extends inward in the customary manner through the felly 10. The outer tube or cover 12 may be made of any material suitable for the purpose, fabric-lined rubber being preferably employed, and the cover is of a tubular form and is split longitudinally on its inner side, the meeting edges being provided with spiral wire coils 15 which are adapted to interlock and which, to enable them to the more readily interlock, are of opposite pitch. These spiral coils are held together by a flexible wire rod 16, which extends longitudinally through them, as shown in Figs. 1 and 3, the wire rod being run through the projecting end portions of the coil, after they have been interlocked, so as to prevent the two coils from pulling apart. If a single wire is used, the wire is provided at one end with a head 17 which is held in a laterally extending socket or yoke 18 projecting from the washer 19, which washer is adapted to encircle the valve 14; and in the yoke 18, between the head 17 and the outer end of the yoke, is a spiral spring 20, which encircles the rod 16 and acts as a cushion and also serves to hold the wire taut. The other end 21 of the rod 16 is pointed, so that it may be run readily through the coils 15, and it is also screw threaded to enable it to be screwed into the outer end of a yoke 22, which is formed on one side of a washer 23, which is similar to the washer 19, and which is also adapted to encircle the valve 14.

When the coils 15 of the cover 12 are brought together so as to interlock at the portion of the cover near the valve, the rod 16 may be thrust longitudinally through the coils and it will act as a wedge to move the coils together, thus uniting the edges of the cover and forming it into an endless tube. The free end of the wire rod may be screwed into the yoke 22, as shown in Figs. 2 and 4, and the rod is thus made fast and the edges of the cover 12 held together. Instead, however, of using a single rod, as described, two wire rods may be used, each adapted to extend half way around the tire, and to provide for this construction, two similar washers 24 are used, which are adapted to encircle the valve 14 and lie outside the felly, like the washers 19 and 23 described above, each washer 24 having on one side a socket 25 adapted to receive and hold the head 26 of a rod 27, which is pointed at its free end, as shown at 28, and is adapted to extend half way around the tire. The action of these rods in uniting and fastening the coils of the cover is similar to that of the rod 16 described above.

It will be seen from the above description that when either the single fastening rod or the double fastening rods are used, the cover of the tire may be instantly opened or closed, and consequently the inner tube may be easily reached.

Having thus described my invention, I claim as new and desire to secure by Letters Patent—

1. In a pneumatic tire, the outer tube or cover split longitudinally on its inner side, and means, as the interlocking coils and the fastening rod, for holding the meeting edges of the cover together, substantially as described.

2. In a pneumatic tire, the outer tube or cover split on its inner side, the interlocking coils at the meeting edges of the cover, and the fastening rod extending longitudinally through the coils, substantially as described.

3. A pneumatic tire, comprising an inner inflatable tube of the usual kind, an outer cover for the tube, the cover being split longitudinally on its inner side, interlocking coils fastened to the meeting edges of the cover, and a flexible fastening rod adapted to extend through the coils and provided at one end with a washer to encircle the valve of the inner tube, substantially as described.

4. The combination, with the inner inflatable tube having the usual valve, the outer tube or cover, split longitudinally on its inner side, and the interlocking coils at the meeting edges of the cover, of the washers adapted to encircle the valve of the inner tube, and the flexible fastening rod having one end held to one washer and the other end screw-threaded and adapted to engage the other washer, substantially as described.

WILLIAM R. BARRETT.

Witnesses:
WILLIAM R. RYAN,
DEMOREST HOPPER.